United States Patent [19]
O'Connor

[11] Patent Number: 6,137,404
[45] Date of Patent: Oct. 24, 2000

[54] METHOD AND APPARATUS FOR PREVENTING ENTRAPMENT BY A VEHICLE CLOSURE

[75] Inventor: Christopher J. O'Connor, Northville, Mich.

[73] Assignee: Prospects, Corp., Novi, Mich.

[21] Appl. No.: 09/318,965

[22] Filed: May 26, 1999

[51] Int. Cl.⁷ .................................................. G08B 13/00
[52] U.S. Cl. .................... 340/541; 340/540; 340/545.1; 307/10.1; 307/326; 454/128; 454/129; 49/26
[58] Field of Search ................................. 340/541, 545.1, 340/545.2, 545.3, 545.4, 540; 307/10.1, 326; 180/173, 174, 232; 454/128, 129, 130; 49/26, 502, 503, 506, 507

[56] References Cited

U.S. PATENT DOCUMENTS

| | | | |
|---|---|---|---|
| 4,796,013 | 1/1989 | Yasuda et al. | 340/562 |
| 5,054,686 | 10/1991 | Chuang | 236/49.3 |
| 5,399,950 | 3/1995 | Lu et al. | 318/565 |
| 5,539,290 | 7/1996 | Lu et al. | 318/565 |
| 5,723,959 | 3/1998 | Iwata et al. | 318/447 |
| 5,952,801 | 9/1999 | Boisvert et al. | 318/468 |
| 5,955,854 | 9/1999 | Zhang et al. | 318/480 |
| 5,983,567 | 11/1999 | Mitsuda | 49/26 |
| 6,064,165 | 5/2000 | Boisvert et al. | 318/465 |

*Primary Examiner*—Jeffery A. Hofsass
*Assistant Examiner*—Toan Pham
*Attorney, Agent, or Firm*—Weingarten, Schurgin, Gagnebin & Hayes LLP

[57] ABSTRACT

Motorized operating mechanisms for vehicle portal closure members, such as windows, sunroofs, sliding doors, hatches, or convertible tops are common in modern automobiles. Inadvertent operation of such closure members, however, has been known to cause injury and entrapment when such a member is directed to close at an inappropriate moment. A vehicle entrapment prevention system is provided which prevents undesired and possibly injurious operation of such a vehicle portal closure member. Undesired operation often occurs when younger occupants, such as small children, accidentally trigger the operating mechanism, which can cause the closure member to entrap an unsuspecting victim. Such an entrapment prevention system ensures safe operation by determining the presence of a responsible operator through the use of various sensors, and permits operation of a portal closure member only in the presence of such a responsible operator.

22 Claims, 4 Drawing Sheets

METHOD AND APPARATUS FOR PREVENTING ENTRAPMENT BY A VEHICLE CLOSURE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Electronic operating mechanisms for automotive windows, sunroofs, and, in recent years, sliding doors are commonplace. Such a mechanism provides convenience to a vehicle operator, and also improves safety by avoiding the distraction of manual operation of a closure mechanism while driving. Such operating mechanisms, however, can present a hazard to small children who might be inclined to extend hands, arms, and heads through open windows, sunroofs, doors, or hatches. Often the controls for portal closure members such as windows, sunroofs, doors, and hatches are in a location likely to be used as a step or knee brace by a small child, such as a horizontal door handle or center console. Further, many operating mechanisms have an express close feature, which requires only a single momentary contact to set the closure member into a full closure motion. Undesired closure, such as by the child or a sibling accidentally activating the control switch, can cause the closure member to close on an unsuspecting victim, resulting in entrapment and/or injury. Further, improper operation could also injure pets or cause damage to fragile cargo items extended through such a portal.

Some modern operating mechanisms, however, attempt to address such hazards by incorporating an obstacle detection system which serves to prevent such closure members from accidentally closing on an object or body part inserted onto the closure path. Such obstacle detection systems include both contacting and non-contacting methods of object detection. Contacting obstacle detection systems sense premature resistance against the closure member caused by impact with an object while traveling the closure path. A certain impact resistance threshold triggers object detection; such a system then stops and/or retracts the closure member. Such an impact resistance threshold, however, may not be sufficient to prevent entrapment and/or injury to a small child.

Non-contacting obstacle detection systems sense an intervening object without physical contact, such as by infrared (IR) beams, and therefore do not present the impact resistance threshold threat of the contact obstacle detection systems.

Both contact and non-contact obstacle detection systems, however, can incorporate an override feature. Such an override feature allows an operator to override the object detection system and force closure member operation. Such operation may be desirable in certain circumstances, such as when vehicle cargo dimensions require objects to be extended through a window, or when accumulated snow and ice triggers the impact resistance threshold and restricts operation of the closure member.

Nonetheless, such override features are often operated at the same or proximate point as the control switch. Therefore, such an override can be susceptible to the same undesired operation as with systems without obstacle detection. It would therefore be beneficial to develop an entrapment prevention system which prevents undesired operation of both normal and override modes of operation of such closure members, yet permits intended override operation by detecting the presence of a responsible operator to ensure that such operation is intended and not accidental.

BRIEF SUMMARY OF THE INVENTION

A vehicle closure entrapment prevention system is disclosed which prevents undesired and possibly injurious operation of a powered portal closure member such as a window, sunroof, sliding door, hatch, or convertible top of a vehicle. Undesired operation often occurs when younger occupants, such as small children, accidentally trigger the operating mechanism, which can cause the closure member to entrap an unsuspecting victim or damage fragile objects extending through the portal. Such an entrapment prevention system ensures safe operation by determining the presence of a responsible operator through the use of various sensors, and permits operation of a portal closure member only in the presence of such a responsible operator.

Such an entrapment prevention system does not absolutely restrict operation of such a vehicle portal closure member, but rather serves to ensure the presence of a responsible operator before permitting such operation. In this manner, deliberate override operation, such as required to manipulate awkward cargo loads or to accommodate snow or ice buildup, is not impeded. Only accidental, unintended operation, such as that which might result from a child or pet inadvertently activating a control switch, is prevented.

BRIEF DESCRIPTION OF THE SEVERAL VIEWS OF THE DRAWING

FIG. 2b is a side view of the vehicle in FIG. 2a; and

DETAILED DESCRIPTION OF THE INVENTION

Figure 1:
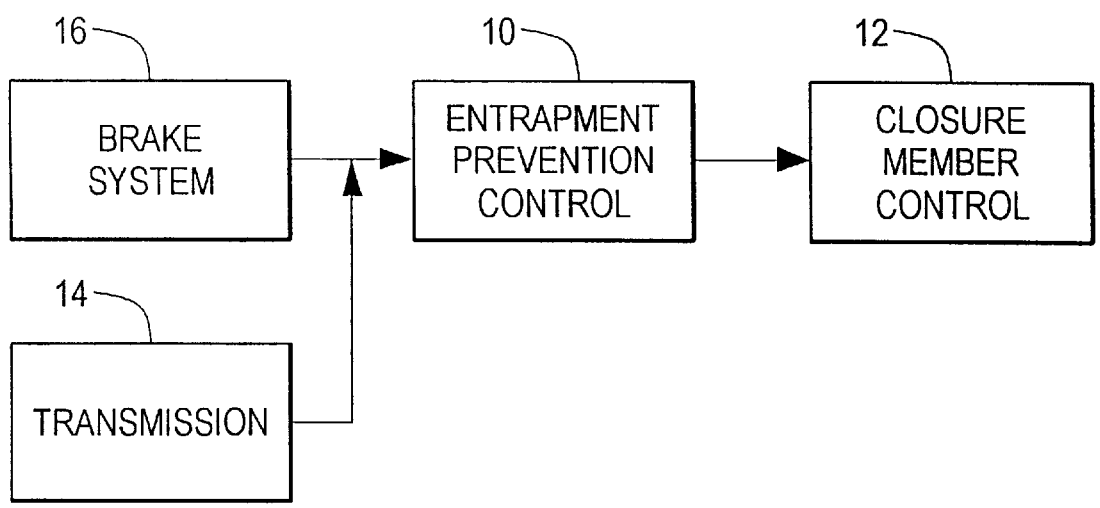
FIG. 1 is a block diagram of a first embodiment of the invention as defined herein.

Referring to FIG. 1, a block diagram of a first embodiment of the entrapment prevention system is disclosed. Entrapment prevention control 10 controls portal closure member control 12, thereby allowing or disallowing operation of vehicle portal closure members such as windows, sunroofs, sliding doors, hatches, and convertible tops. Entrapment prevention control 10 receives signals indicative of the state of the transmission 14 and indicative of the state of the brake system 16. For example, brake system 16 status may be provided by a brake light switch which is closed when the brake pedal is depressed. Transmission 14 status could be provided from a dashboard light showing the drive gear. The appropriate combination(s) of inputs from the brake system 16 and the transmission 14 is used by the entrapment prevention control 10 to establish the presence or absence of a responsible operator. If entrapment prevention control 10 does not determine that a responsible operator is present, closure member operation is prevented.

Figure 2A:
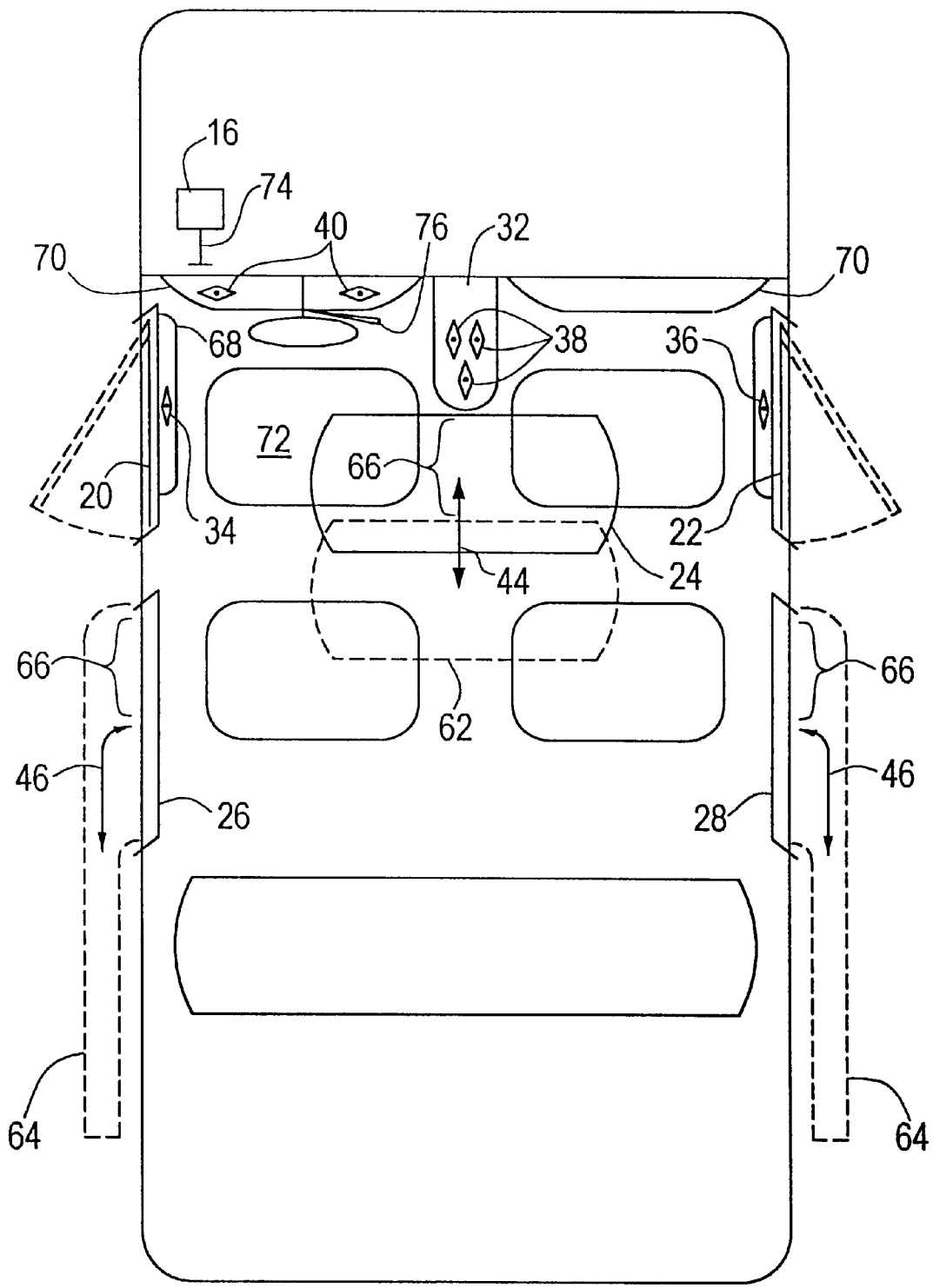
FIG. 2a is a plan view of a vehicle illustrating the entrapment prevention system as defined herein.
Figure 2B:
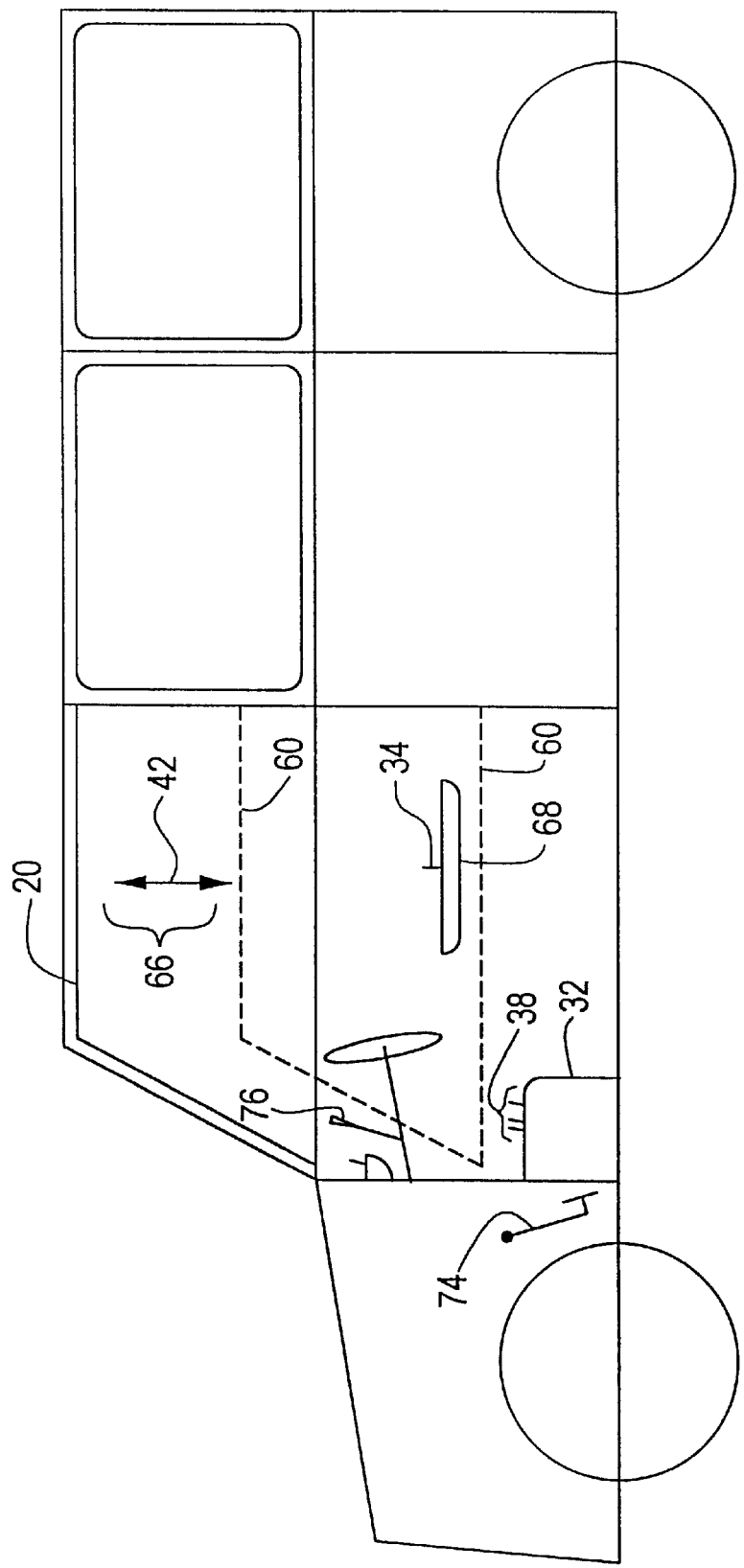

Referring to FIGS. 2a and 2b, a typical vehicle control arrangement is shown. Typical vehicle portal closure members include windows 20 and 22, sunroof 24, and sliding doors 26 and 28. Other closure members not illustrated but which could be similarly controlled include hatches and convertible tops. Such closure members are often operated from door handle switches 34 and 36, center console switches 38, or dashboard switches 40. The path of each of the closure members is shown by arrows 42, 44, and 46 for window, sunroof, and sliding door closure members, respectively.

The open position of closure members is indicated by dotted lines 60, 62, and 64, for the window, sunroof, and sliding door, respectively. Unintended operation of the closure members 20, 22, 24, 26 and 28 can result in entrapment of an unsuspecting victim in entrapment zones 66 as the closure members travel toward their closed positions. Such operation is likely to occur when small children attempt to climb or stand on the center console 32, door handle 68, or dashboard 70. As such closure members are typically operated by switches 34, 36, 38, and 40 in these locations, accidental manipulation of a switch is likely. Accordingly, the present invention provides a method to detect the presence of a responsible operator in an operator position 72 such that operation of the closure members 20, 22, 24, 26 and 28 can only occur when such an operator is present. The system can be adapted for right or left hand drive positions.

Figure 3:
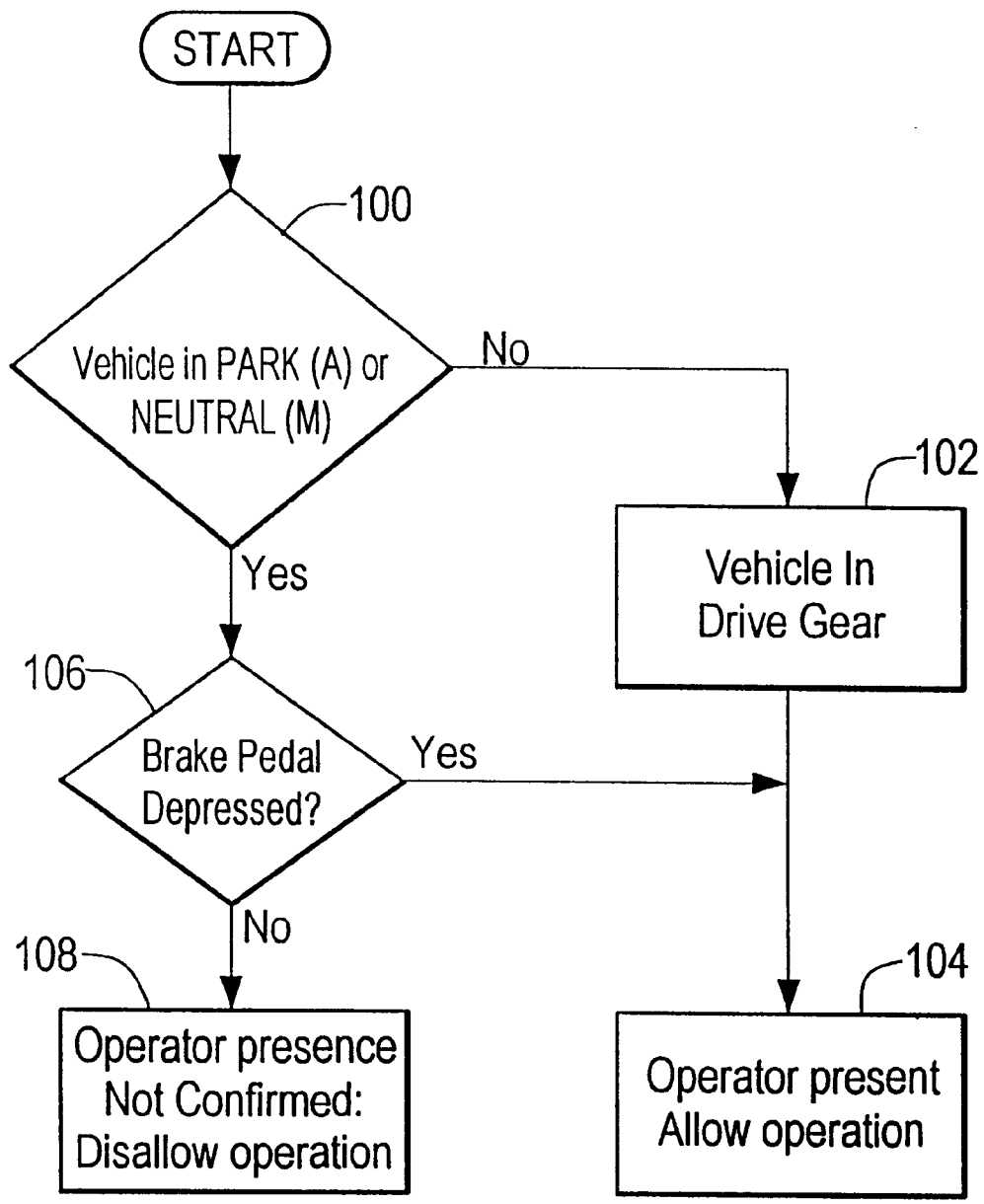
FIG. 3 is a flowchart illustrating the entrapment prevention system of FIGS. 2a and 2b.

Referring to FIG. 3, a first embodiment is shown in which operator presence is determined by an input from the brake system 16, such as directly from the brake pedal 74, and from an input from the transmission 14, such as from the position of the transmission control lever 76. First, a check is made 100 to determine if the vehicle is in PARK, for an automatic transmission, or NEUTRAL, for a manual transmission. If not, the vehicle is determined to be in a drive gear 102 and operator presence is confirmed, therefore closure member operation is allowed 104. If the vehicle is in PARK or NEUTRAL, a check is made of the brake pedal 106. If the brake pedal is depressed, operator presence is confirmed and closure member operation is allowed 104. If the brake pedal is not depressed, operator presence remains unconfirmed and closure member operation is disallowed 108.

Since it is unlikely that a child would be able to depress the brake pedal and extend a body member through a closure portal simultaneously, entrapment prevention is effected. Further, since it is unlikely that a vehicle would be in a drive gear without a responsible operator present, such a check also serves to prevent entrapment. By detecting the presence of a responsible operator, rather than merely sensing intervening objects through the use of an obstacle detection system, a more reliable entrapment prevention method is provided, since many obstacle detection systems provide an override feature which can be used to force operation despite the presence of intervening objects in the path of the closure member.

Conventional object detection systems typically provide such an override to bypass the object detection system and force closure member operation when the object detection system restricts movement when not necessary or when not desired. Override features may be required, for example, to allow cargo to extend through an open window which is then partially closed to clamp the cargo in place. Such override features, however, are also subject to accidental triggering, and therefore do not serve to provide entrapment prevention.

Accordingly, the present invention effectively prevents entrapment during both normal and override operation. Override operation is still possible, for example, to accommodate irregular cargo, provided that the entrapment prevention control determines that a responsible operator is present. In this manner, unintended operation is restricted irrespective of override features which provide a bypass of the obstacle detection system Such an entrapment prevention system is adaptable to either aftermarket installation or integration with the vehicle manufacturing process.

Interconnection of the brake system to the vehicle can be provided through the brake light activation switch, which is closed when the brake pedal is depressed. This activation switch can be used to provide a brake pedal signal from the brake system 16 to entrapment prevention control 10 (FIG. 1). Interconnection of the transmission signal, indicative of whether the vehicle is in PARK or NEUTRAL, can be provided from a drive gear indicator light, or can be activated through a mechanical switch driven by the transmission control lever 76 (FIG. 2), or gear shift (not shown) in the case of manual transmissions.

In one embodiment, the brake pedal 74 signal and transmission control lever 76 position signal are utilized in the entrapment prevention control logic to determine operator presence, however alternative logic can be used. For example, the parking brake setting may be used in conjunction with the transmission as a further indicator of operator presence. Similarly, a speedometer or odometer cable sensor may be incorporated to ascertain operator presence.

In another embodiment, operator presence is determined by an occupant sensing system, which is becoming commonplace in many vehicles for use in conjunction with systems such as air bags and seat belts. Such occupant sensing systems are typically integrated into the vehicle at manufacturing time, rather than as part of an aftermarket installation. Mediums such as seat pressure sensors, IR beams, and ultrasonic sensors are being utilized to determine vehicle occupant presence. Such an occupant sensing system could also be connected to entrapment prevention control 10 to ascertain the presence of an operator in the operator position 72, or further to verify that the person present in the operator position is an adult.

As various extensions and modifications to the invention as described herein may be apparent to those skilled in the art, the present invention is not intended to be limited except by the scope of the following claims.

What is claimed is:

1. A method of preventing undesired operation of a vehicular portal closure member comprising the steps of:

receiving, at an entrapment prevention controller, at least one sensor signal relating to the presence of a vehicle operator;

determining, from said at least one sensor signal, an operator presence state indicative of the presence of an operator at an operating position in said vehicle;

preventing, if said operator presence state is negative, operation of said vehicle portal closure member;

allowing, if said operator presence state is positive, operation of said vehicle portal closure member.

2. The method of claim 1 wherein said step of receiving further comprises receiving said at least one sensor signal from a sensor which is non-contacting with respect to the vehicle occupants.

3. The method of claim 1 wherein said step of receiving further comprises receiving said at least one sensor signal as a brake pedal activation signal.

4. The method of claim 3 wherein said step of receiving further comprises receiving said at least one sensor signal as a transmission gear signal.

5. The method of claim 4 wherein said determining step further comprises comparing said brake pedal activation signal and said transmission gear signal to predetermined values.

6. The method of claim 5 wherein said determining step determines said operator presence state to be negative if said brake pedal activation signal is indicative of an undepressed brake pedal and said transmission gear signal indicates a transmission not in a drive gear.

7. The method of claim 5 wherein said determining step determines said operator presence state to be positive if said brake pedal signal is indicative of a depressed brake pedal and said transmission gear signal indicates a transmission not in a drive gear.

8. The method of claim 5 wherein said determining step determines said operator presence state to be positive if said transmission gear signal indicates a transmission not in a drive gear.

9. The method of claim 1 wherein said step of receiving further comprises receiving said at least one sensor signal as an occupant detection signal.

10. The method of claim 9 wherein said receiving step further comprises receiving said occupant detection signal from an integrated vehicular subsystem adapted to provide said occupant detection signal to at least one other vehicular system.

11. The method of claim 10 wherein said step of receiving further comprises receiving at least one sensor signal from at least one sensor adapted to sense mediums selected from the group consisting of pressure, infrared, and ultrasound.

12. The method of claim 1 wherein said portal closure members of said preventing and allowing steps are powered members selected from the group consisting of a window, a sunroof, a sliding door, a hatch, and a convertible top.

13. An apparatus for preventing entrapment by vehicular portal closure members comprising:

an entrapment prevention controller operable to disallow operation of a vehicular portal closure member;

at least one sensor connected to said entrapment prevention controller and adapted to provide a signal indicative of operator presence; and control logic in said entrapment prevention controller for determining an operator presence state from said signal from said at least one sensor.

14. The apparatus as in claim 13 wherein said at least one sensor is non-contacting with respect to vehicle occupants.

15. The apparatus as in claim 14 wherein said at least one sensor comprises a brake system activation sensor.

16. The apparatus as in claim 15 wherein said at least one sensor further comprises a transmission status sensor.

17. The apparatus as in claim 16 wherein said entrapment prevention controller disallows said vehicle portal closure member operation when said operator presence state is indicative of the absence of an operator.

18. The apparatus as in claim 16 wherein said control logic determines the absence of an operator when said brake system sensor is indicative of an inactive brake system and said transmission status sensor is indicative of a transmission not in a drive gear.

19. The apparatus as in claim 16 wherein said control logic determines the presence of an operator when said brake system sensor is indicative of an active brake system and said transmission status sensor is indicative of a transmission not in a drive gear.

20. The apparatus as in claim 16 wherein said control logic determines the presence of an operator when said transmission status sensor is indicative of a transmission in a drive gear.

21. The apparatus as in claim 13 wherein said signal indicative of operator presence is provided by an integrated vehicular subsystem adapted to provide said signal indicative of operator presence to at least one other vehicular system.

22. The apparatus as in claim 13 wherein said at least one sensor comprises sensors adapted to sense mediums selected from the group consisting of pressure, infrared, and ultrasound.

* * * * *